(12) United States Patent
Spalink

(10) Patent No.: US 10,680,863 B2
(45) Date of Patent: Jun. 9, 2020

(54) MODULATION APPARATUS

(71) Applicant: Sony Corporation, Tokyo (JP)

(72) Inventor: Gerd Spalink, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 758 days.

(21) Appl. No.: 15/075,619

(22) Filed: Mar. 21, 2016

(65) Prior Publication Data

US 2016/0294590 A1    Oct. 6, 2016

(30) Foreign Application Priority Data

Mar. 31, 2015 (EP) .................................. 15161951.7

(51) Int. Cl.
*H04L 27/20* (2006.01)
*G01S 7/35* (2006.01)
(Continued)

(52) U.S. Cl.
CPC ............. *H04L 27/205* (2013.01); *G01S 7/35* (2013.01); *G01S 13/0209* (2013.01); *G01S 13/583* (2013.01)

(58) Field of Classification Search
CPC ..... H04L 27/205; G01S 7/35; G01S 13/0209; G01S 13/583
(Continued)

(56) References Cited

U.S. PATENT DOCUMENTS 3,780,369 A * 12/1973 Auer ...................... G01S 13/53
                                                            342/67
4,755,761 A *  7/1988 Ray, Jr. ................. H03D 3/007
                                                            329/323
(Continued)

FOREIGN PATENT DOCUMENTS

CA      2181843 C  *  3/2000   ......... H04L 27/2331
CA      2245072 C  * 10/2003   ........... H04L 27/362
(Continued)

OTHER PUBLICATIONS

M. L. Suarez Penaloza et al. "A Cartesian Sigma-Delta Transmitter Architecture", Radio and Wireless Symposium, 2009, RWS'09, IEEE, 2009, 2 pages (Abstract only).
(Continued)

*Primary Examiner* — Bernarr E Gregory
*Assistant Examiner* — Nuzhat Pervin
(74) *Attorney, Agent, or Firm* — Xsensus LLP

(57) ABSTRACT

Modulation apparatus, comprising: a first delta-sigma modulator for providing a digital in-phase signal based on a modulation of an in-phase component of a baseband signal; a second delta-sigma modulator for providing a digital quadrature signal based on a modulation of a quadrature component of the baseband signal; a first multiplicative combiner for combining a carrier signal with the digital in-phase signal and for providing an in-phase output signal; a second multiplicative combiner for combining the carrier signal with the digital quadrature signal and for providing a quadrature output signal; a delay component for generating a 90° phase shift between the in-phase output signal and the quadrature output signal; and an additive output combiner for combining the in-phase output signal and the quadrature output signal and generating a transmit signal.

16 Claims, 12 Drawing Sheets

(51) Int. Cl.
*G01S 13/02* (2006.01)
*G01S 13/58* (2006.01)

(58) Field of Classification Search
USPC .......................................................... 342/194
See application file for complete search history.

(56) References Cited

U.S. PATENT DOCUMENTS

| | | | | | |
|---|---|---|---|---|---|
| 5,521,559 | A | * | 5/1996 | Ichihara | H03C 3/00 332/103 |
| 5,952,947 | A | * | 9/1999 | Nussbaum | H03M 3/392 341/143 |
| 6,339,621 | B1 | * | 1/2002 | Cojocaru | H04L 27/362 375/247 |
| 6,459,743 | B1 | * | 10/2002 | Lipka | H03D 3/007 329/310 |
| 6,744,825 | B1 | * | 6/2004 | Rimstad | H03M 3/50 375/298 |
| 6,763,072 | B1 | * | 7/2004 | Matsui | H04L 27/2627 375/260 |
| 6,977,556 | B1 | * | 12/2005 | Petrovic | H03B 21/025 331/1 A |
| 7,010,280 | B1 | * | 3/2006 | Wilson | H04L 27/2046 330/10 |
| 7,449,960 | B2 | * | 11/2008 | Bunch | H03C 3/0966 331/1 A |
| 7,826,554 | B2 | * | 11/2010 | Haque | H03F 3/217 375/297 |
| 8,180,285 | B2 | * | 5/2012 | Rofougaran | H01Q 1/2225 375/295 |
| 8,351,543 | B2 | * | 1/2013 | Kenington | H03F 1/3247 375/259 |
| 8,358,719 | B2 | * | 1/2013 | Danz | H04L 27/364 332/103 |
| 8,687,684 | B1 | * | 4/2014 | Huynh | H03M 3/382 375/224 |
| 8,705,667 | B1 | * | 4/2014 | Huynh | H04B 1/7115 375/340 |
| 8,861,627 | B2 | * | 10/2014 | Voinigescu | H03C 1/36 342/368 |
| 2002/0067773 | A1 | * | 6/2002 | Jackson | H03F 3/24 375/308 |
| 2004/0036638 | A1 | * | 2/2004 | Lipka | H03M 7/3015 341/143 |
| 2006/0034391 | A1 | * | 2/2006 | Belot | H04L 27/206 375/308 |
| 2006/0197613 | A1 | * | 9/2006 | Bunch | H03C 3/0966 331/16 |
| 2007/0253510 | A1 | * | 11/2007 | Danz | H04L 27/364 375/298 |
| 2010/0014575 | A1 | * | 1/2010 | Malmqvist | H03F 3/217 375/238 |
| 2010/0097153 | A1 | * | 4/2010 | Rexberg | H03F 1/02 332/109 |
| 2011/0150130 | A1 | * | 6/2011 | Kenington | H03F 1/3247 375/296 |
| 2012/0013565 | A1 | * | 1/2012 | Westhues | G06F 3/0418 345/174 |
| 2014/0328434 | A1 | * | 11/2014 | Negra | H04L 27/2053 375/308 |
| 2015/0214939 | A1 | * | 7/2015 | Talwalkar | H03F 1/0294 327/172 |
| 2016/0033620 | A1 | * | 2/2016 | Millar | H03L 7/00 342/195 |

FOREIGN PATENT DOCUMENTS

| | | | | |
|---|---|---|---|---|
| EP | 0692867 | A1 | * 1/1996 | ............... H03C 3/00 |
| EP | 1079577 | A2 | * 2/2001 | ......... H04L 27/2627 |

OTHER PUBLICATIONS

R. Feger et al. "An IQ-Modulator Based Heterodyne 77-GHz FMCW Radar", Microwave Conference (GeMIC), 2011, 2 pages (Abstract only).
Reinhard Feger et al. "A Frequency-Division MIMO FMCW Radar System Using Delta-Sigma-Based Transmitters", Microwave Symposium (IMS), 2014 IEEE MTT-S International, IEEE, 2014, 4 pages.

* cited by examiner

MODULATION APPARATUS

BACKGROUND

Field of the Disclosure

The present disclosure relates to a modulation apparatus and modulation method. The present disclosure further relates to a radar system as well as to a communication system including said modulation apparatus.

Description of Related Art

Wireless signal transmission forms the basis for a range of applications in the fields of radar and communications. Due to the increasing number of applications making use of wireless signal transmission, techniques for using the spectrum efficiently and for reducing manufacturing costs have become more and more important.

There is, however, a need for further improvements in this field in particular with respect to manufacturing costs and efficient spectrum use.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a modulation apparatus. It is a further object to provide a modulation method as well as a corresponding computer program for implementing the method and a non-transitory computer-readable recording medium for implementing said method. Still further, it is an object of the present disclosure to provide a radar system as well as a communication system comprising said modulation apparatus.

According to an aspect there is provided a modulation apparatus, comprising:

a first delta-sigma modulator for providing a digital in-phase signal based on a modulation of an in-phase component of a baseband signal;

a second delta-sigma modulator for providing a digital quadrature signal based on a modulation of a quadrature component of the baseband signal;

a first multiplicative combiner for combining a carrier signal with the digital in-phase signal and for providing an in-phase output signal;

a second multiplicative combiner for combining the carrier signal with the digital quadrature signal and for providing a quadrature output signal;

a delay component for generating a 90° phase shift between the in-phase output signal and the quadrature output signal; and an additive output combiner for combining the in-phase output signal and the quadrature output signal and generating a transmit signal.

According to a further aspect a corresponding method is provided.

According to another aspect, there is provided a radar system, comprising:

a modulation apparatus as defined above;

a transmit antenna for transmitting the transmit signal;

a receiver for receiving a reflected signal resulting from a reflection of the transmit signal at a remote object;

an oscillator for providing the carrier signal to the transmitter and the receiver, in particular a local oscillator for providing a constant frequency carrier signal; and a processor for determining a relative velocity of the remote object with respect to the radar system based on the reflected signal.

According to yet another aspect a communication apparatus is provided, comprising:

a modulation apparatus as defined above; and a digital baseband modulator for providing a baseband signal based on a data input.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Further embodiments are defined in the dependent claims. It shall be understood that the disclosed systems, method, computer program and computer-readable recording medium have similar and/or identical further embodiments as the claimed apparatus and as defined in the dependent claims.

In mm-wave circuits, it is desirable to use a simple carrier generation circuit, e.g., a continuous wave carrier or a frequency-modulated continuous wave carrier. Additional modulation could be done with a linear modulator, but is difficult to realize. The modulation apparatus of the present disclosure discloses how to achieve arbitrary I/Q modulation using a low cost delta-sigma technique.

The present disclosure provides a low cost, narrow-band modulation capability for a transmitter operating at mm-wave frequency. The modulation apparatus of the present disclosure can be applied in both continuous wave and frequency-modulated transmitters. If an apparatus according to the present disclosure is included in a frequency-modulated transmitter, it becomes possible to obtain a wide resulting bandwidth. This is advantageous for a high range resolution in radar applications.

In comparison to prior art techniques which offer modulation capability either at high costs by using a wide-band analogue modulator or which use delta-sigma modulation with the drawback of always generating a double side band signal the present disclosure allows reducing manufacturing costs and increasing spectrum use efficiency. In particular, the use of a switch instead of an analogue multiplier for the multiplicative combiner may allow reducing manufacturing costs and power consumption. If a complex, i.e. a single side band, modulation instead of double side band modulation is used it becomes possible to double the spectral efficiency.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
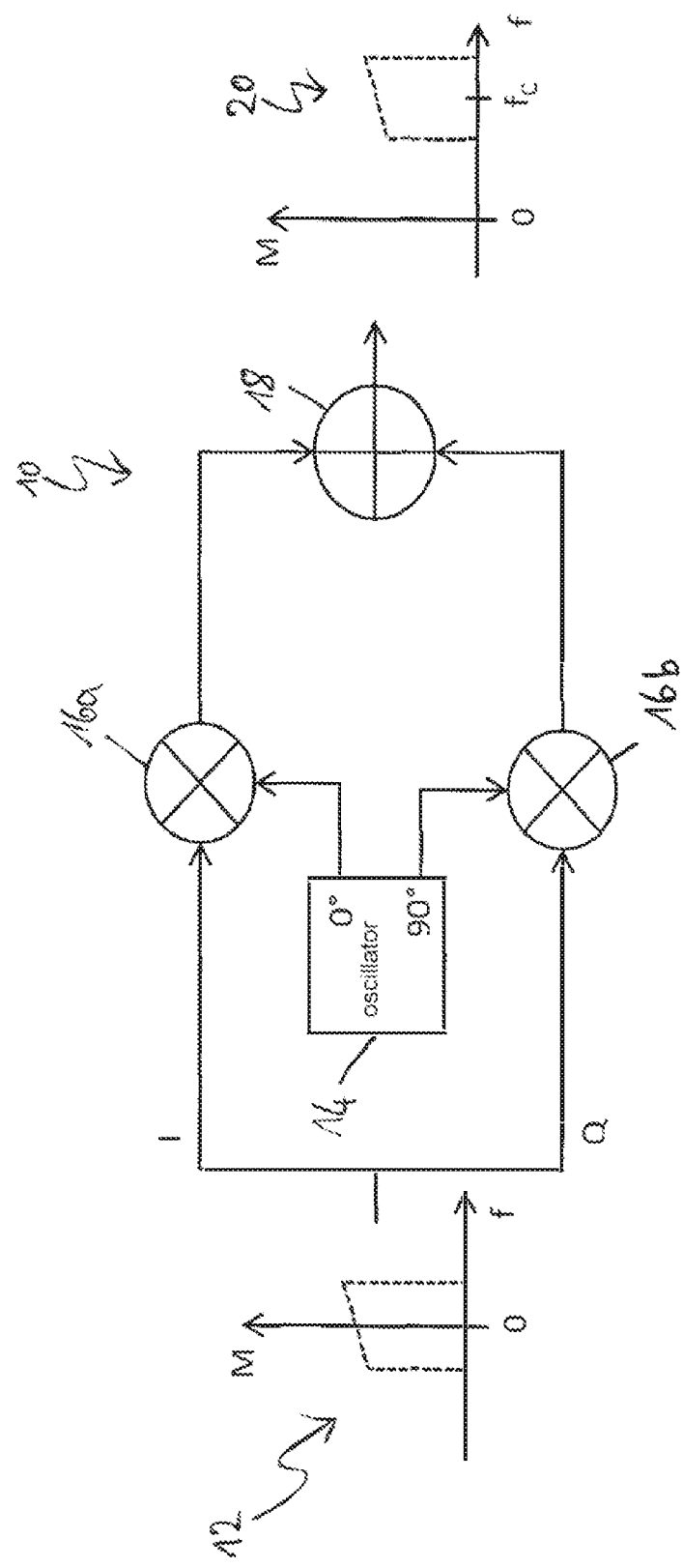
FIG. 1 shows a schematic illustration of a complex-valued I/Q modulation according to prior art.

Referring now to the drawings, wherein like reference numerals designate identical or corresponding parts throughout the several views, FIG. 1 schematically illustrates a prior art modulation apparatus 10. The modulation apparatus 10 makes use of the concept of complex-valued I/Q modulation which has been implemented in a plurality of transmitters. For instance, commercially available devices include the ADRF6720 from Analog Devices or the TRF3722 from Texas Instruments (datasheets for both devices are publicly available in the internet). The in-phase I and quadrature Q components of a baseband signal 12 corresponding to an input signal are separately combined with a carrier signal of a frequency $f_C$ generated by an oscillator 14. A first and a second multiplicative combiner 16a, 16b are used to combine the in-phase and quadrature components with the carrier signal and a 90° phase-shifted carrier signal. The resulting signals are added up in an additive combiner 18 to generate a transmit signal 20. The frequency spectrum of the transmit signal 20 shows the frequency shift by the carrier frequency fc with respect to the baseband signal 12. This results in a mirroring of the baseband signal, which can be understood by the Fourier transform: assuming the Fourier transform of the baseband time domain signal g(t) is G(f), then the transform of g(t) exp(j*2*pi*fc*t) is G(f-fc). The local oscillator term is exp(j*2*pi*fc*t)=cos(2*pi*fc*t)+j*sin(2*pi*fc*t).

Figure 2:
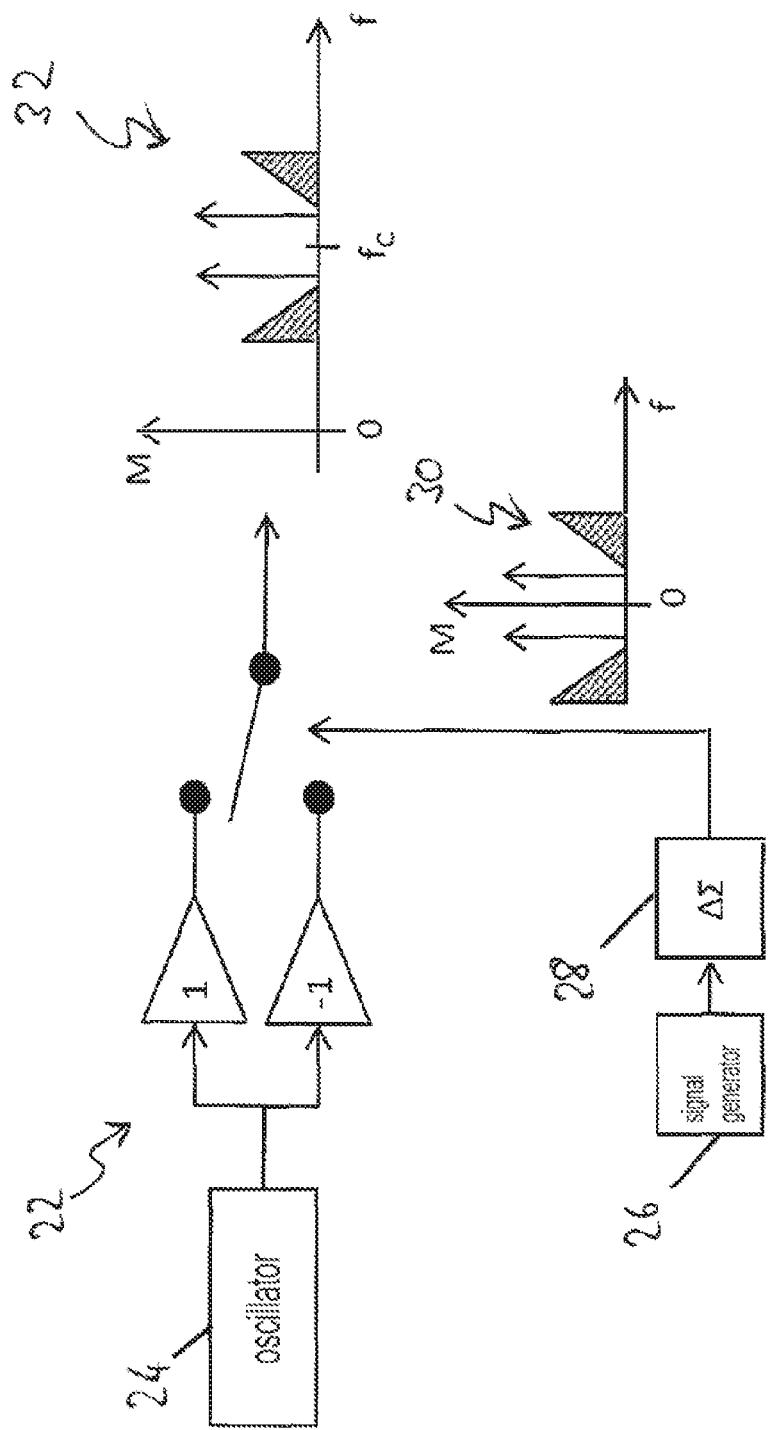
FIG. 2 shows a schematic illustration of real-valued delta-sigma modulation according to prior art.

FIG. 2 schematically illustrates another prior art modulation apparatus 22 making use of real-valued delta-sigma modulation. A comparable approach has been presented in Feger et al., "A Frequency-Division MIMO FMCW Radar System Using Delta-Sigma-Based Transmitters", Microwave Symposium (IMS), IEEE 2014. An oscillator 24, in particular a voltage controlled oscillator (VCO), generates a carrier signal which is combined with a constant frequency baseband signal provided by a signal generator 26 and modulated in a delta-sigma modulator 28. It can be seen that the output 30 of the delta-sigma modulator 28 corresponds to a double side-band transmit signal. After the combination with the carrier signal the spectrum of the transmit signal 32 is shifted by the frequency of the carrier signal $f_C$.

Figure 3:
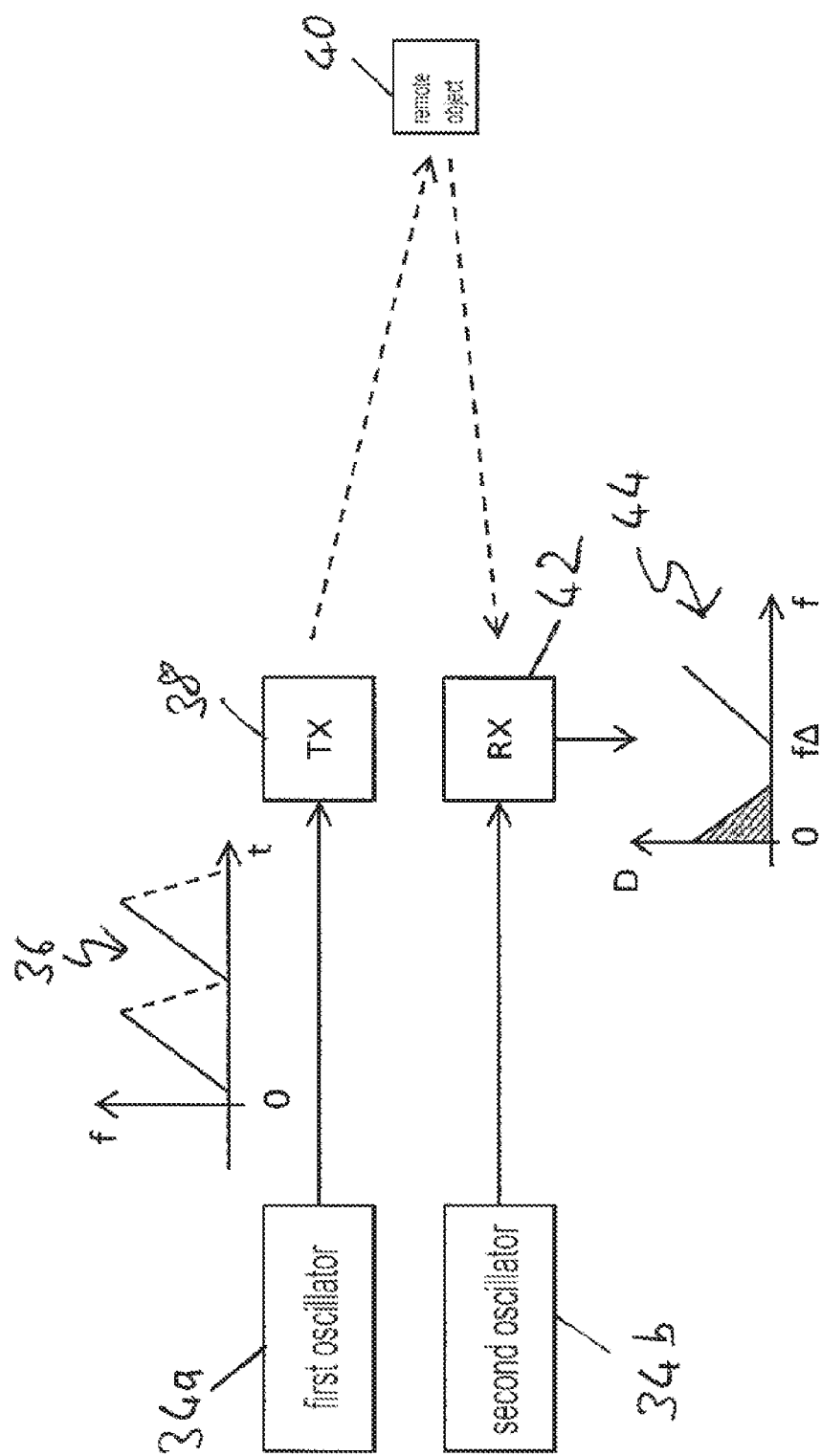
FIG. 3 shows a schematic illustration of a dual chirper architecture for close range FMCW radar according to prior art.

FIG. 3 schematically illustrates a dual chirper architecture for close range FMCW (Frequency Modulated Continuous Wave) radar. A first oscillator 34a, in particular a voltage controlled oscillator, provides a baseband signal of periodically changing frequency 36. The signal is transmitted via a transmitter 38, reflected at a remote object 40 and received by means of a receiver 42. The receiver obtains a signal from a second oscillator, in particular a voltage controlled oscillator. Thereby the frequency f1 of the first oscillator 34a and the frequency f2 of the second oscillator 34b are related to one another via f2=f1-fΔ with fΔ corresponding to a constant frequency difference between two VCOs. The signal 44 received by the receiver 42 is indicative of the distance of the remote object 40.

Figure 4:
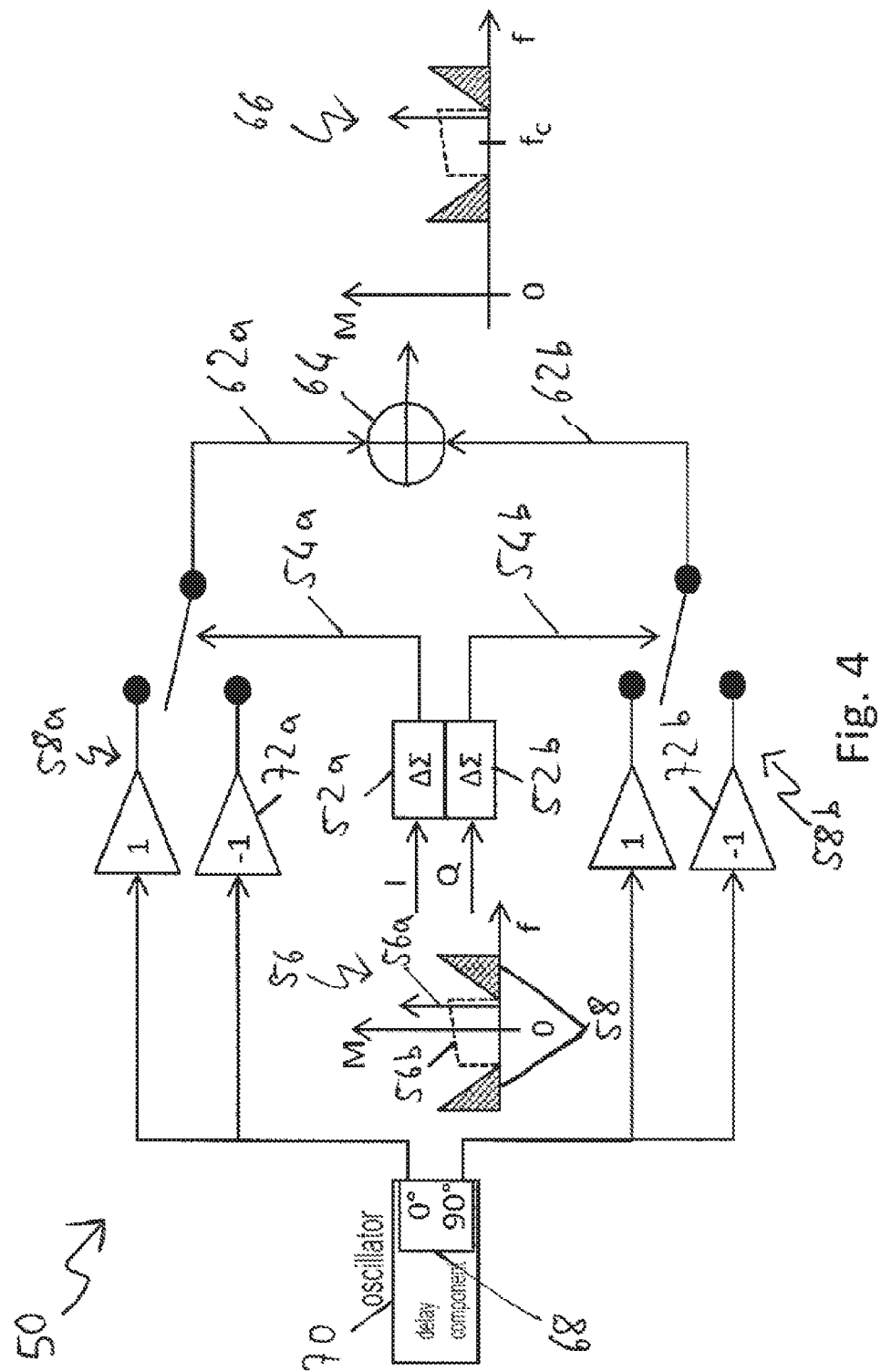
FIG. 4 shows a schematic illustration of an embodiment of a modulation apparatus according to an aspect of the present disclosure.

FIG. 4 illustrates a first embodiment of a modulation apparatus 50 according to the present disclosure. The apparatus 50 includes a first delta-sigma modulator 52a for providing a digital in-phase signal 54a based on a modulation of an in-phase component I of a baseband signal 56 and a second delta-sigma modulator 52b for providing a digital quadrature signal 54b based on a modulation of a quadrature component Q of the baseband signal 56. The baseband signal may correspond to a signal of a single frequency 56a or to a signal of a broader frequency band 56b. There is no limit of the type of baseband signal being used as long as the bandwidth does not reach into the noisy regions. Examples include analogue audio or video signals, or digitally modulated signals carrying some data in QAM or OFDM modulation. Usually, noise components 58 resulting from undesired delta-sigma noise will be present. The noise component 58 may particularly result from the quantization of the level-continuous input signals to the discrete-level output signal of the delta-sigma block.

The apparatus 50 further comprises a first multiplicative combiner 58a for combining a carrier signal 60 with the digital in-phase signal 54a and for providing an in-phase output signal 62a and a second multiplicative combiner 58b for combining the carrier signal 60 with the digital quadrature signal 54b and for providing a quadrature output signal 62b. Furthermore, the apparatus 50 comprises an additive output combiner 64 for combining the in-phase output signal 62a and the quadrature output signal 62b and generating a transmit signal 66. Still further, the present disclosure comprises a delay component 68 for generating a 90° phase shift between the in-phase output signal 62a and the quadrature output signal 62b. In the embodiment illustrated in FIG. 4 this delay component 68 is integrated into an oscillator 70. It is possible to operate fully digital up to the output of the multiplicative combiner. This may result in unwanted components of three, five or seven times the carrier frequency. Usually, this is easy to attenuate. Usually, the addition is analogue. However, an all digital implementation of the adder is also possible. Then, both signals 62a and 62b will have the levels −1 or +1. After the adder, the possible levels are then −2, 0, +2. This signal would have to be sent to a ternary D/A converter to get an analogue transmit signal.

In the embodiment illustrated in FIG. 4, the carrier signal is provided by the oscillator 70. This oscillator 70 may be comprised in the apparatus 50. The oscillator 70 may particularly be represented by a voltage controlled oscillator (VCO) for providing an adjustable carrier signal or a local oscillator (LO) for providing a constant frequency carrier signal. As used herein, the carrier signal may particularly refer to a mm-wave signal corresponding to a signal of GHz frequency, e.g. in the range of 3-300 GHz.

In the embodiment illustrated in FIG. 4 the first multiplicative combiner 58a includes an inverter 72a for inverting the carrier signal 60 depending on the digital in-phase signal 54a, and the second multiplicative combiner 58b includes an inverter 72b for inverting the carrier signal 60 depending on the digital quadrature signal 54b. The combination of the inverter 72a, 72b and the switch can efficiently be implemented as a Gilbert cell. The multiplicative combiners 58a, 58b may also be referred to as delta-sigma switches.

As used herein, the term baseband signal refers to an input signal. In particular, the baseband signal is a complex baseband signal of a constant frequency. This baseband signal may be provided by a numerically controlled oscillator (NCO). The baseband signal could be analogue. Preferably, however, a discrete-time (sampled) signal is used that is quantized to a large number of bits (e.g. 16 bits for 96 dB dynamic range). The delta-sigma block will interpolate this signal to a higher sample rate, then quantize it into two or three levels. These operations are conveniently done in the digital domain. As outlined above, examples for baseband signals include analogue audio or video signals, or digitally modulated signals carrying some data in QAM or OFDM modulation provided by corresponding audio or video devices.

Application areas for the modulation apparatus of the present disclosure particularly include radar systems and communication apparatuses. For the radar application, the disclosure results in a single carrier transmit signal per antenna. Thus, the standard FMCW radar detection algorithms can be used, and the spectral efficiency is doubled. Twice as many transmit paths can be accommodated in the same beat frequency range. Twice the beat frequency range (maximum distance) can be covered with the same number of antennas.

For instance, in FMCW radar, one standard procedure (corresponding to a detection algorithm) is to calculate the Fourier transform of the received signal. The magnitude of the Fourier transform shows peaks for some frequencies. Each peak corresponds to one target (as used herein, a target may also be referred to as remote object). The frequency of the target corresponds to the distance of the target. The spectral efficiency can be doubled since real signals are always symmetric in the frequency domain. By using a complex signal, it becomes possible to generate asymmetric signals. In case of a sine wave, the spectral line on the negative side of the spectrum can be suppressed. Therefore, the negative side of the spectrum can be used for other purposes.

In FMCW radar, the disclosure can be used to drive both the receiver and the transmitter with the same mm-wave oscillator, in particular a local oscillator (LO) or voltage controlled oscillator (VCO), while still providing a small frequency offset of the transmitter. This helps to avoid 1/f noise issues and allows for detection of targets close to the radar system. Close targets can be detected since the frequency of a target peak is proportional to the target distance according to $f=k*d$. Close targets will show up as peaks at small frequencies. Usually, however, 1/f noise covers such close targets. The present disclosure allows shifting the correspondence between frequency and distance according to $f=k*d+f\Delta$. In power-limited semiconductor technology, e.g. mm-wave CMOS, it may be necessary to combine two transmit amplifiers per antenna to achieve the desired power. The requirement for two transmit paths imposed by the disclosure is no disadvantage in this case. It is proposed to implement two delta-sigma modulated transmitter paths for an in-phase and a quadrature signal and to combine (=add) them to get a single side band signal corresponding to a transmit signal.

Figure 5:
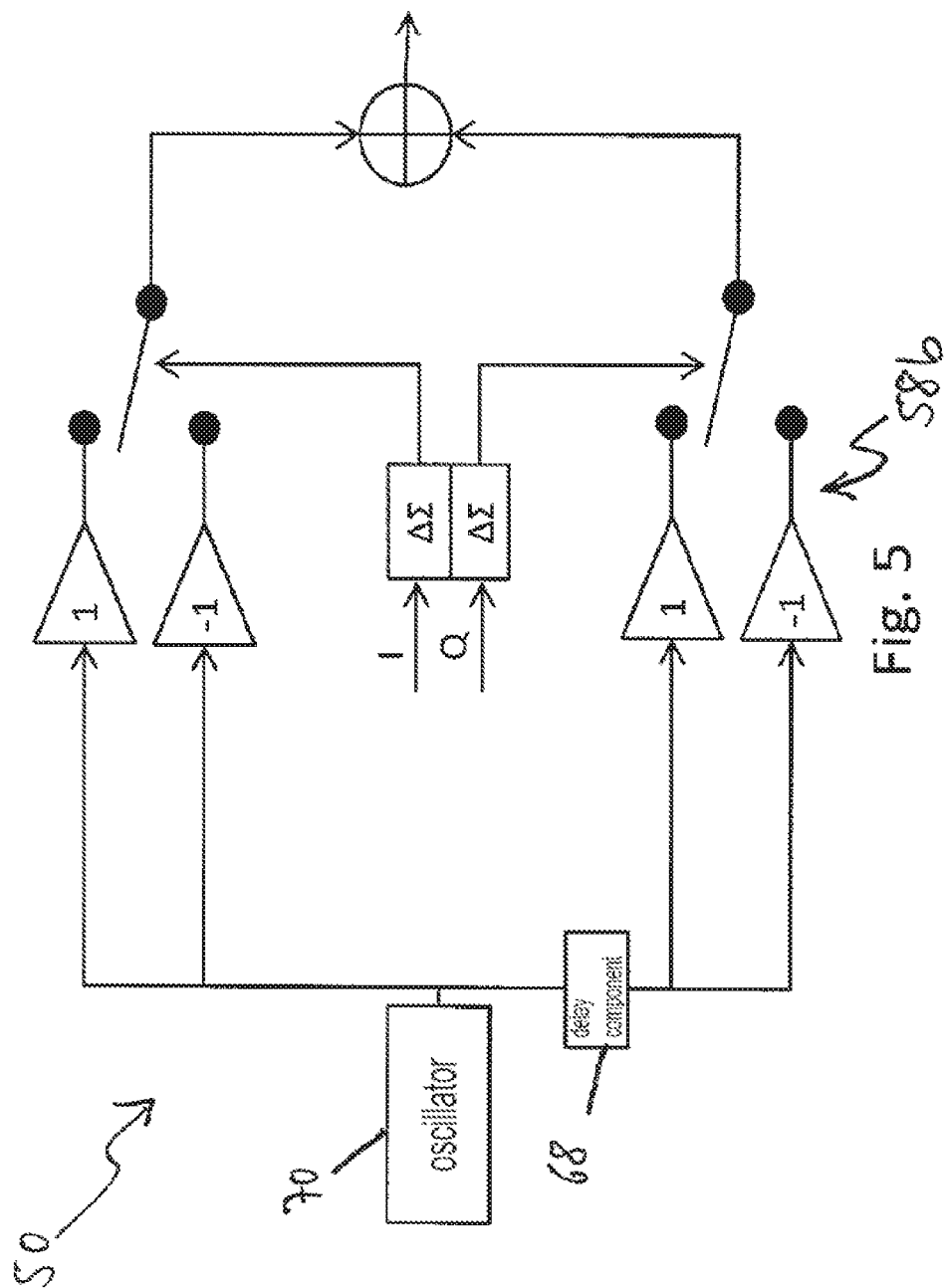
FIG. 5 shows a schematic illustration of another embodiment of a modulation apparatus according to an aspect of the present disclosure.
Figure 6:
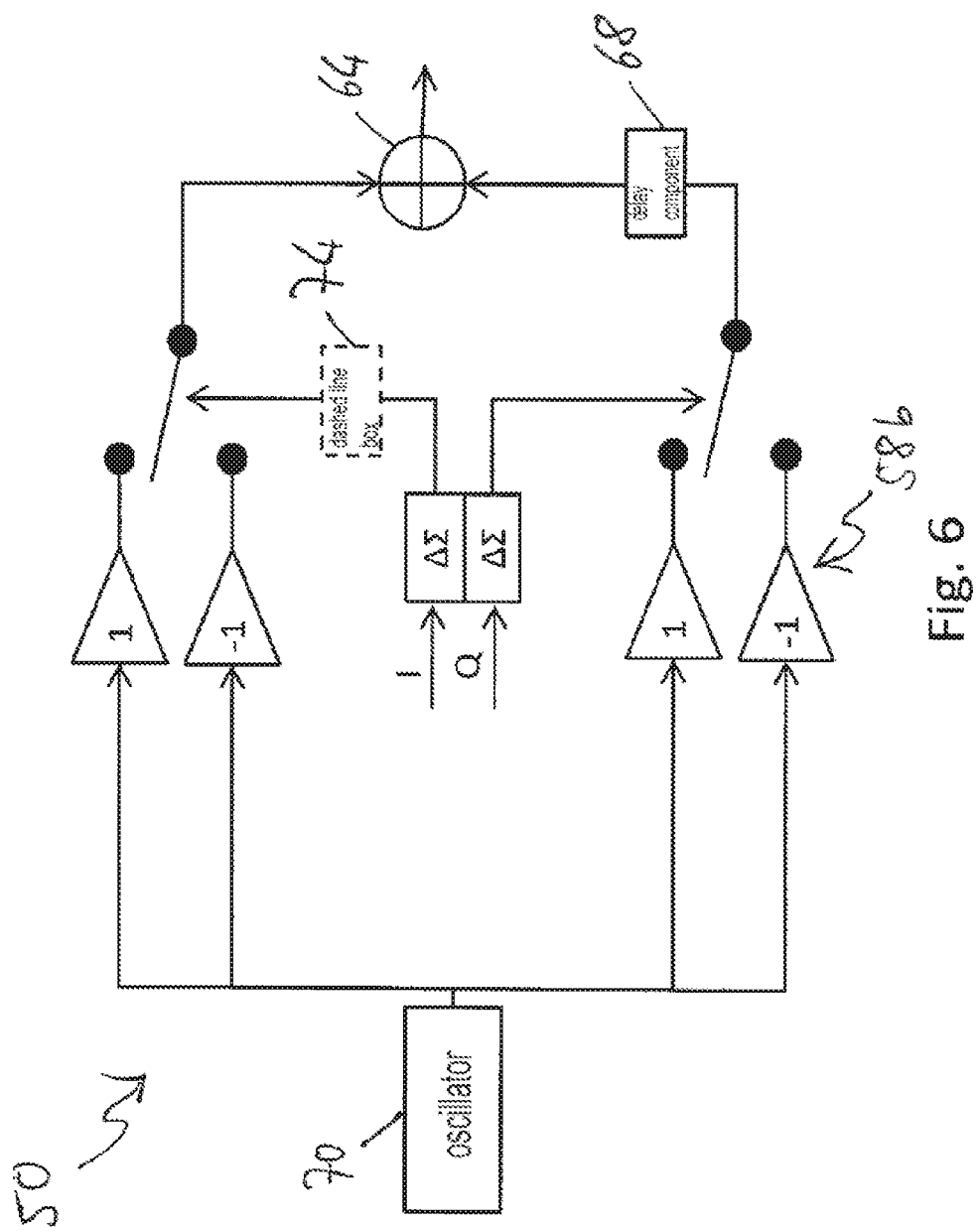
FIG. 6 shows a schematic illustration of yet another embodiment of a modulation apparatus according to an aspect of the present disclosure.

FIGS. 5 and 6 illustrate preferred embodiments of apparatuses 50 according to the present disclosure with respect to the delay component 68. In particular, the 90° phase shift can be efficiently implemented by a delay line or a RC filter (analogue filter) corresponding to the delay component. It is possible to do that before or after the delta-sigma switches.

In FIG. 5 it is illustrated that the delay component 68 (corresponding to a delay line or to an analogue filter) can be located in a signal path from the oscillator 70 to the second multiplicative combiner 58b. In FIG. 6 it is illustrated that the delay component 68 can be located in a signal path from the second multiplicative combiner 58b to the output combiner 64. This is particularly advantageous if delay insertion in the path from the oscillator 70 is not possible. This may, e.g., be the case if an apparatus according to the disclosure is integrated into a single chip. Then, the delay line or filter may be too large to fit in the chip area. Deviations from ideal gain and phase, also if frequency dependent, can be compensated by pre-distortion of the I/Q signal. Errors in magnitude or phase before the additive combiner will result in a signal that resembles the signal illustrated in FIG. 2: the mirror image of the desired signal is still present in the transmitted signal. The pre-distortion of the I/Q signal can be calibrated for optimum image suppression. It is not required to insert a delay component into the I-path as indicated by the dashed line box 74 if delay<<sample time. In another embodiment (not illustrated) it may also be possible that the delay component is split in two parts. Then, e.g., one part could be placed before the multiplicative combiner and the other one after it. In that case, the delay component will include two delay component parts.

The delay component 68 may be represented by delay line. Such a delay line usually passes signals of a comparably narrow band and may be comparably large for lower frequencies, e.g. a frequency of 10 GHz corresponding to $\lambda \approx 2$ cm on a PCB may be reasonable for a delay line. Alternatively, an analogue filter may represent the delay component 68. Such a filter may correspond to a constant amplitude, i.e. a constant phase filter based on L, R and C components, have a limited bandwidth, be large, be subject to component variation issues and be applicable up to several GHz. The present disclosure proposes to generate the 90° phase shift in one of the RF paths and not within the oscillator. This results in an additional degree of freedom for the designer. The designer may choose to split the delay and implement both blocks. Only the total delay is relevant from a functional point of view.

As a further alternative the delay component may be represented by a digital divider generating 4-times the oscillator frequency and use a digital divider. This requires a very wide band and may be applicable up to several GHz. As yet another alternative, the delay component may be represented by an oscillator based on an operational amplifier in which the integration of a sine wave yields a cosine wave, which may be applicable up to several MHz.

Ideally, the delay component has constant magnitude and a constant phase of 90 degrees over the bandwidth of the signal passing through it. Simple realizations are possible if the deviation from this ideal behaviour is sufficiently small. At mm-wave and small relative bandwidth, a delay line is one of the standard methods In particular, the delay component may be represented by a delay line or by an analogue filter. A delay line has a constant magnitude over frequency, but a linear phase over frequency. The length can be chosen so that the phase at the carrier center frequency is 90 degrees. If the variations of the carrier frequency are small, the phase will always be near the required 90 degrees. In case of an analogue filter made from lumped components, amplitude response and phase response depends on the component values. The required constant magnitude and 90 degrees phase can be obtained for a larger relative bandwidth.

Figure 7:
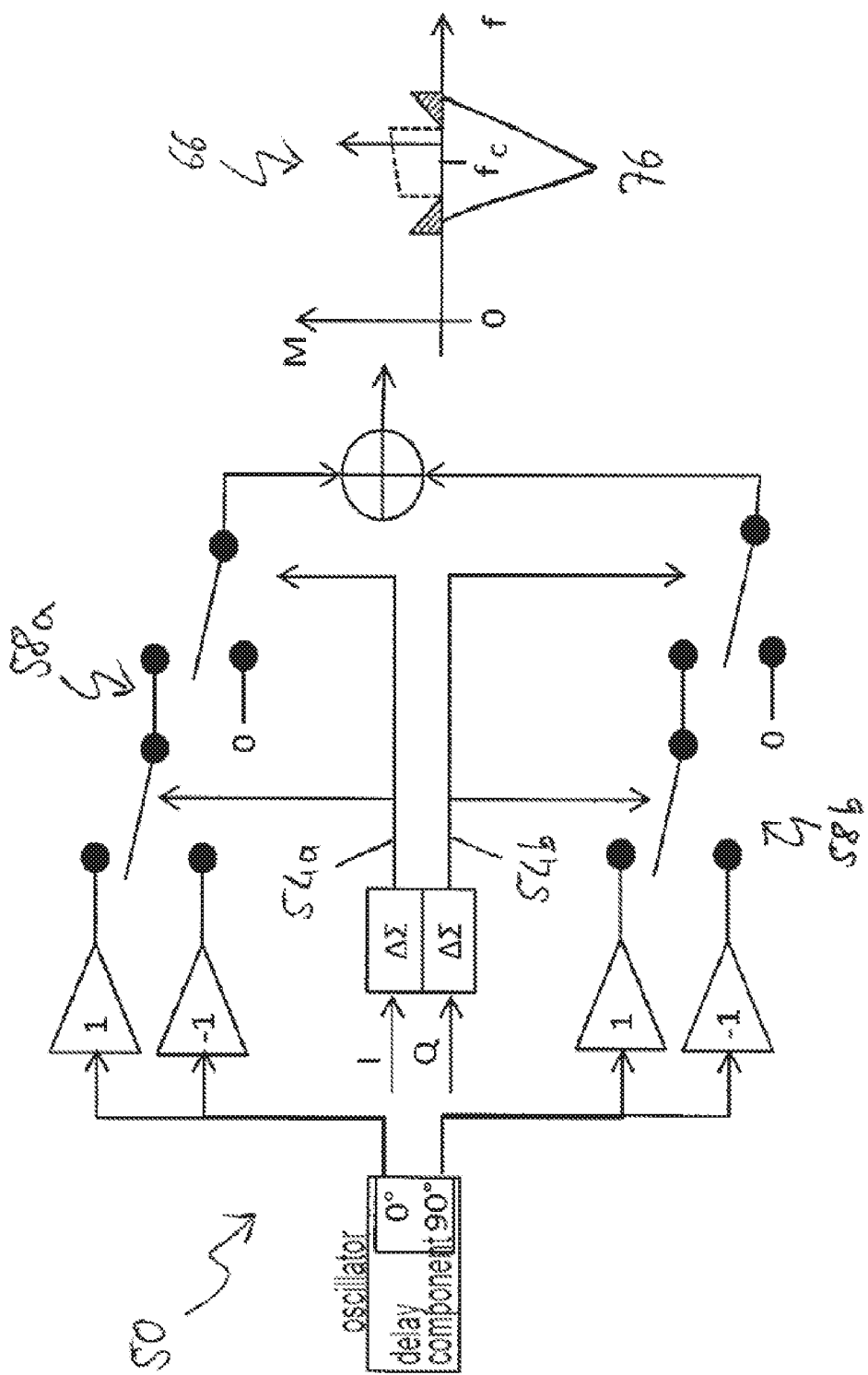
FIG. 7 shows a schematic illustration of an alternative delta-sigma modulator for use in a modulation apparatus according to an aspect of the present disclosure.

In FIG. 7 another preferred embodiment of an apparatus 50 according to the present disclosure is schematically illustrated. The embodiment corresponds to an alternative delta-sigma modulator based on three-level delta-sigma modulation. The multiplicative combiners 58a, 58b are represented by three level delta-sigma switches. All switches are easy to implement at mm-wave frequency. The first multiplicative combiner 58a is configured to switch between the carrier signal, an inverted carrier signal and zero depending on the digital in-phase signal 54a. The second multiplicative combiner 58b is configured to switch between the carrier signal, an inverted carrier signal and zero depending on the digital quadrature signal 54b. In this embodiment, the delta-sigma modulator preferably has a three-level quantizer. As a further alternative (not shown) it is also possible to make another quantizer structure. Both a two-level and a three-level modulator may reduce noise. It is schematically illustrated that the noise 76 in the transmit signal 66 is reduced. This is the case since delta-sigma noise has the same behavior as the usual quantization noise. If the number of quantization levels is doubled, the desired signal power will stay the same, and the noise power will go down by 6 dB. In embodiments of the present disclosure it may also be possible to use more than three quantization levels, which may allow reducing the quantization noise even more.

It is to be understood that the embodiment illustrated in FIG. 7 can be combined with the embodiments illustrated in FIGS. 5 and 6 in particular with respect to the location of the delay component.

Figure 8:
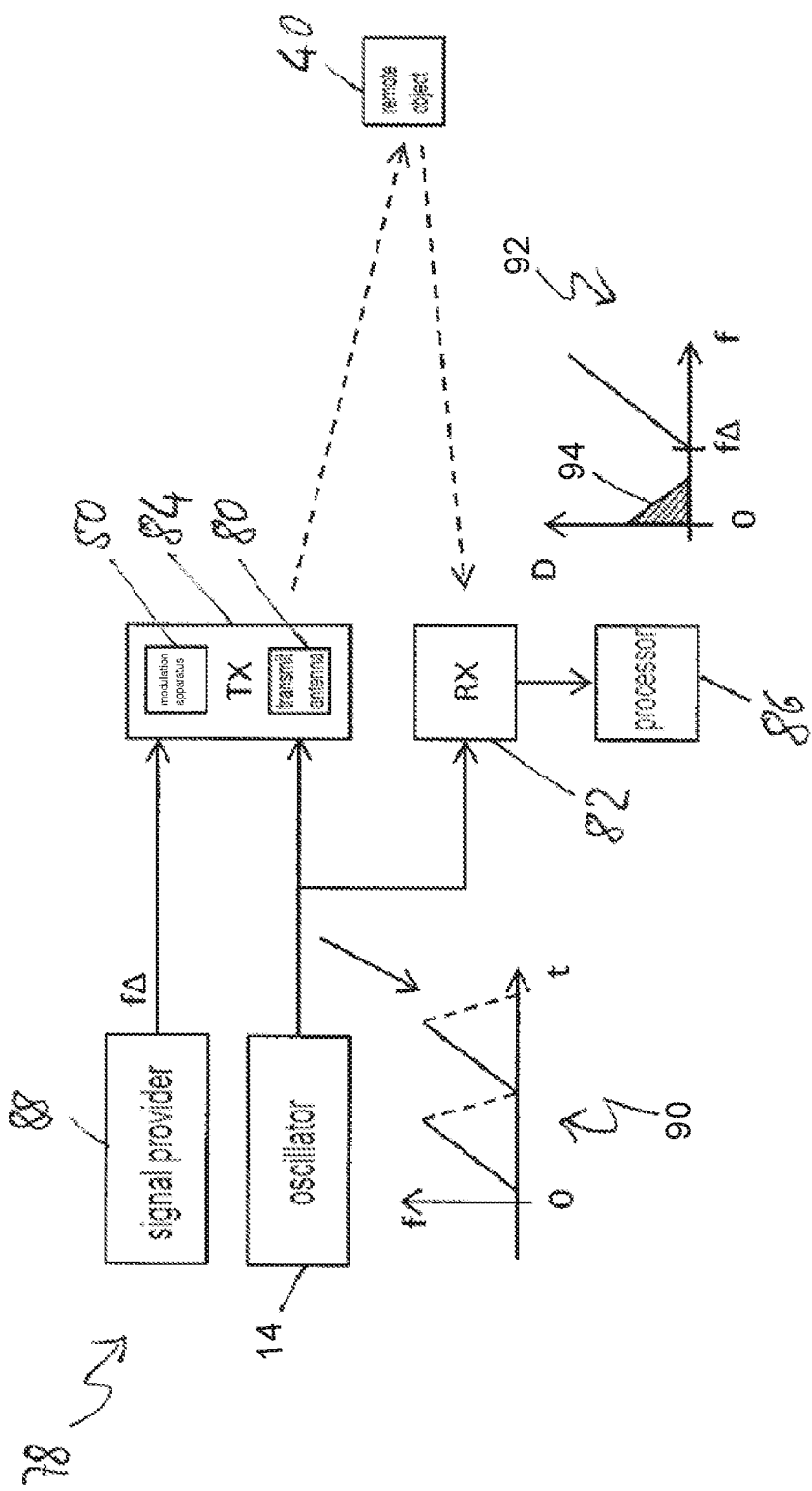
FIG. 8 shows a schematic illustration of an embodiment of a radar system according to an aspect of the present disclosure.
Figure 9:
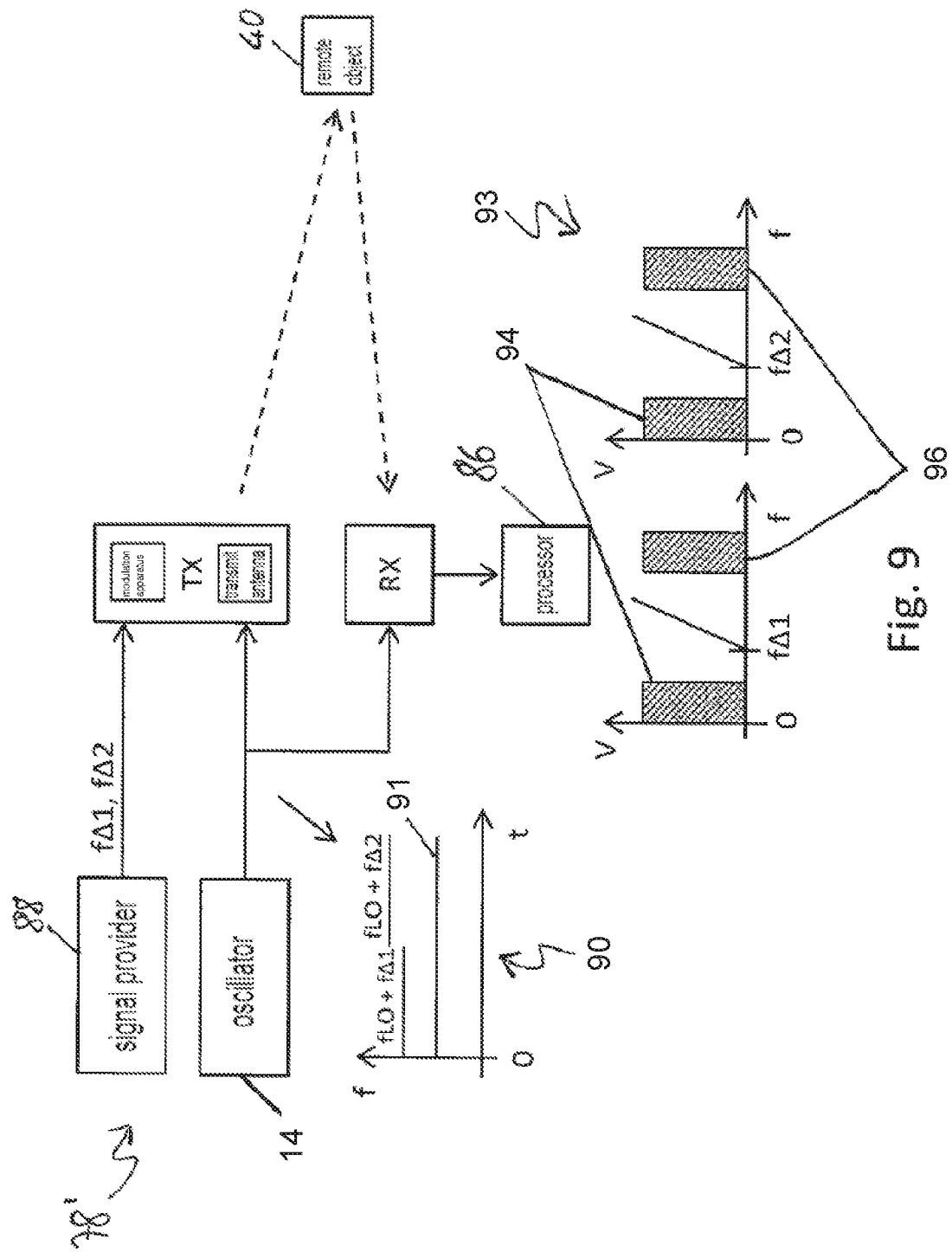
FIG. 9 shows a schematic illustration of another embodiment of a radar system according to an aspect of the present disclosure.
Figure 10:
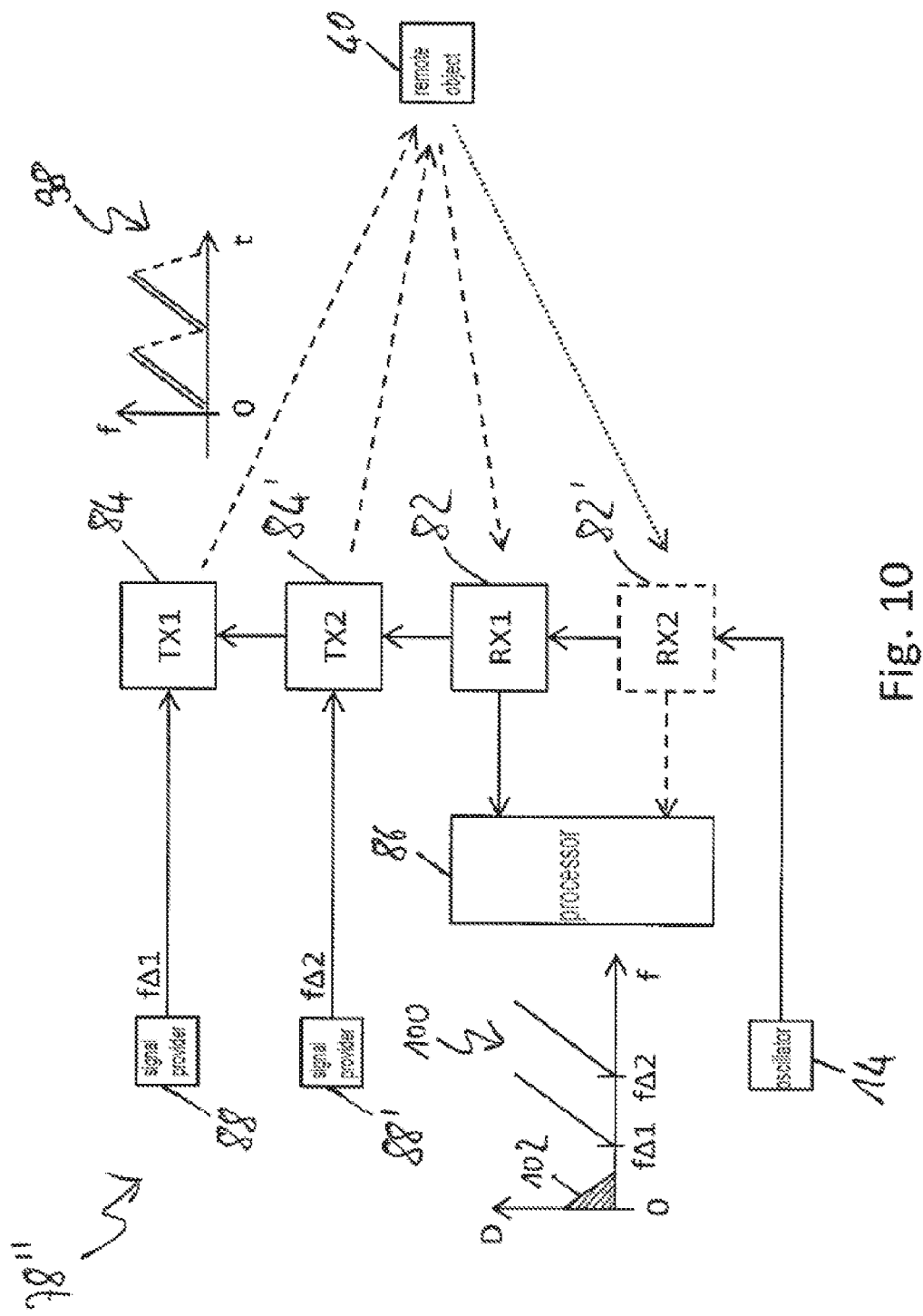
FIG. 10 shows a schematic illustration of yet another embodiment of a radar system according to an aspect of the present disclosure.

FIGS. 8 to 10 schematically illustrate embodiments of a radar system according to an aspect of the present disclosure.

In particular, FIG. 8 schematically illustrates a single VCO FMCW radar system 78 with an offset between transmit and receive frequency. The system 78 comprises a modulation apparatus 50 according to the present disclosure as defined above and a transmit antenna 80 for transmitting the transmit signal. As illustrated, a transmitter 84 may particularly include the modulation apparatus 50 and the transmit antenna 80. The system 78 further comprises a receiver 82 for receiving a reflected signal resulting from a reflection of the transmit signal at a remote object 40. Still further, the system 78 comprises a processor 86 for determining a relative distance and/or velocity of the remote object 40 with respect to the radar system 78 based on the reflected signal.

As illustrated in FIG. 8 the modulation apparatus 50 obtains a baseband signal from a signal provider 88, in particular a numerically controlled oscillator. The carrier signal is provided by the oscillator 14, in particular a voltage controlled oscillator. In the illustrated embodiment, the signal provider 88 provides a signal of frequency fΔ, corresponding to a modulation signal for shifting up the VCO signal in the frequency domain by fΔ. The oscillator 14 provides a carrier signal 90 of varying frequency. Thereby, it becomes possible to derive a distance of the remote object 40 from the received reflected signal 92 in addition to the relative velocity. It can be seen that 1/f noise 94 is avoided. If the target distance is 0, the received signal will have the frequency fΔ, thus avoiding the 1/f noise region. If, e.g., fΔ=0, then a target at distance 0 will show up at the frequency 0, completely concealed by the 1/f noise. Thus, the present disclosure allows detecting the remote object 40 even if it is close to the system 78. Pink noise or 1/f noise (sometimes also called flicker noise) is a signal or process with a frequency spectrum such that the power spectral density (energy or power per Hz) is inversely proportional to the frequency of the signal.

The illustrated architecture in FIG. 8 corresponds to a single chirper architecture for close range FMCW radar and enables radar operation for close targets. In FMCW radar applications, both the target distance and the relative target velocity cause a frequency change of the received signal. This is undesired, because it is not possible to decide from the detected frequency whether it is a distant or a fast target. By changing the FMCW ramp speed, it is possible to tune sensitivity more towards velocity or towards distance. It is possible to use very fast ramp speeds, which will give a good distance measurement that is almost insensitive to the target velocity. The velocity can be detected separately by looking at subsequent ramps. Therefore, the primary information from the FMCW radar is distance, not velocity. A key attribute of the radar system 78 according to the present disclosure is that the same oscillator 14 is used for the transmitter 84 and the receiver 82. This results in a coherent system. The phase of the down-converted receive signal is accurate and a function of the distance.

Preferably, the baseband signal has a periodically changing frequency or a temporarily constant frequency; and the processor 86 is configured to determine a distance of the remote object 40 with respect to the radar system in addition to the relative velocity.

FIG. 9 schematically illustrates a frequency shift keying (FSK) radar system 78' according to an aspect of the present disclosure. In particular, the oscillator 14 is represented by a local oscillator providing a signal of a fixed frequency fLO 91. The baseband signal provided by the signal provider 88 is of a temporarily constant frequency, in particular of two frequencies fΔ1 and fΔ2. The carrier signal 90 is also illustrated. In the illustrated simple local oscillator system a constant and identical frequency for both the transmitter and the receiver is assumed. Positive and negative speeds can be sensed. If fΔ is zero, it would not be possible to sense speeds near zero. By looking at the phase difference, it is also possible to sense the distance of a single target. The processor 86 evaluates the received signal 93 to derive therefrom the relative velocity of the remote object 50. It can be seen that the received signal includes both 1/f noise 94 as well as delta-sigma noise 96. For FSK radar the distance of the remote object 40 can be derived from:

$$\text{Distance} = \frac{\varphi_2 - \varphi_1}{4 \cdot \pi \cdot (f\Delta 2 - f\Delta 1)} \cdot c$$

wherein φ corresponds to the phase angles of fΔ1 and fΔ2 and c corresponds to the speed of light. The receiver will see a sine wave. Assuming synchronized transmitter and receiver, the received sine wave has a phase angle which can be calculated for f∆1 and f∆2. This relation is further described in Mahafza, "Radar Systems Analysis and Design Using MATLAB Second Edition", ISBN 1-58488-532-7 (cf. chapter 3.5 "Multiple Frequency Continuous Wave Radar").

FIG. 10 schematically illustrates a simultaneous transmit MIMO (Multiple Input Multiple Output) or MISO (Multiple Input Single Output) FMCW (may also be referred to as Multi-FMCW radar) system 78" according to an aspect of the present disclosure. In comparison to the embodiments illustrated in FIGS. 8 and 9 the system 78" comprises at least one further modulation apparatus and transmit antenna in a further transmitter 84' in addition to the transmitter 84. Both make use of the same carrier signal provided by the oscillator 14, in particular a voltage controlled oscillator.

The transmitters are separated because they are down-converted to different frequencies. It is illustrated that two transmit signals 98 are generated based on the input from two signal providers 88, 88', in particular two numerically controlled oscillators. The signal providers provide baseband signals of frequencies f∆1 and f∆2, which generate transmitted signals on different frequencies. Thereby, it is possible to activate the two transmitters simultaneously without the danger that they interfere with one another.

At least one further receiver 82' in addition to the receiver 82 may (optionally, as indicated by the dashed line) also be comprised in the system 78" for receiving at least one further reflected signal resulting from a reflection of the at least one further transmit signal at the remote object 40. A MIMO system uses multiple receivers for many transmitters. It is, however, also possible that a single channel and receive antenna is used and a MISO system is realized. Both possibilities correspond to embodiments of the present disclosure.

It is to be understood that it is also possible that more than two modulation apparatuses etc. may be included.

The processor 86 is configured to determine a relative distance and/or velocity of the remote object 40 with respect to the radar system 78" based on the reflected signals 100. The 1/f noise 102 can be avoided by setting f∆1>0.

In comparison to prior art systems the modulation apparatus of the present disclosure allows doubling the spectral efficiency. This can translate into doubling the number of transmit antennas or doubling the possible radar range in the case of MIMO or MISO systems. For instance, a fixed total bandwidth BW on the receiver and a frequency of a target at the maximum distance of fmax are assumed. Then, prior art system require a bandwidth of 2*fmax per transmit antenna. nTx_prior=BW/(2*fmax). The system of the present disclosure requires a bandwidth of 1*fmax per transmit antenna. nTx_new=BW/fmax. The same applies equivalently to the maximum range if nTx is kept the same for both systems, fmax_prior=BW/(2*nTx) in contrast to fmax_new=BW/nTx.

Figure 11:
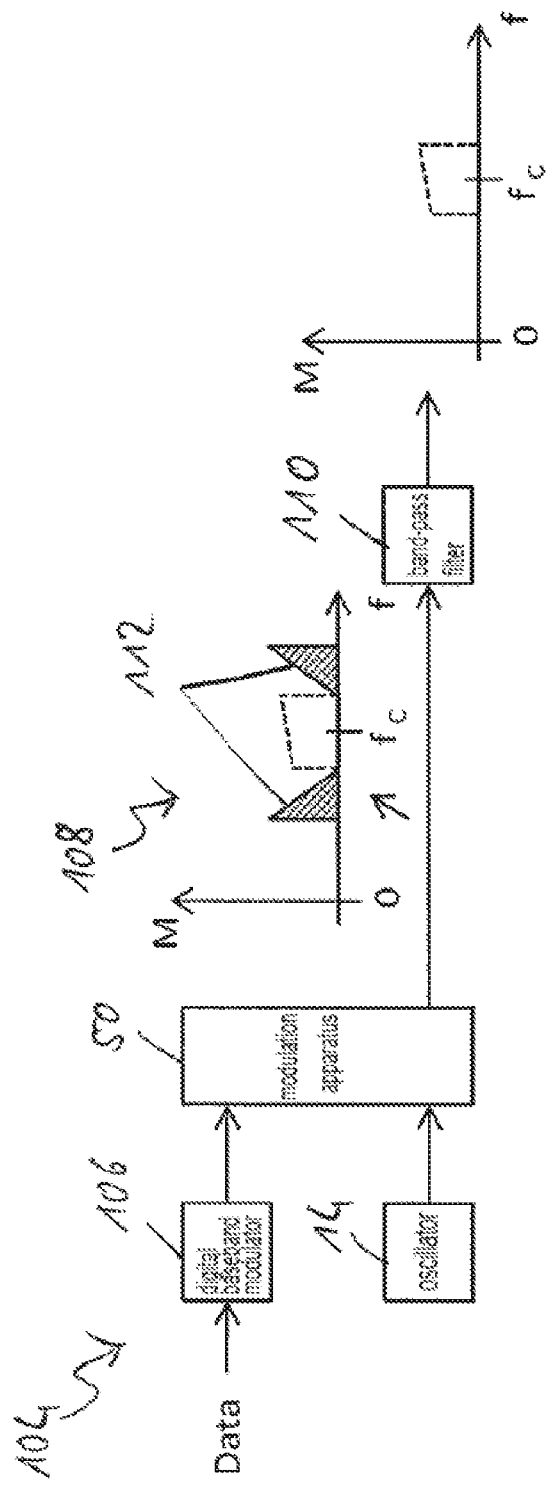
FIG. 11 shows a schematic illustration of an embodiment of a communication system according to an aspect of the present disclosure.

In FIG. 11 a communication system 104 according to an aspect of the present disclosure is schematically illustrated. In particular, the illustrated system 104 corresponds to a low-cost narrow-band RF transmitter. The system 104 comprises a modulation apparatus 50 as defined above. Further, the system 104 comprises a digital baseband modulator 106 for providing a baseband signal based on a data input (i.e. data for transmission). The provided signal corresponds to a modulated signal, in particular a digital signal. The system 104 usually also comprises an oscillator 14, in particular a local oscillator. The transmit signal 108 provided by the apparatus 50 usually has a wider bandwidth. There may further be comprised a band-pass filter 110 for filtering the transmit signal 108. This additional filter allows removing the delta-sigma noise 112.

In an exemplary embodiment for a desired bandwidth of 8 MHz a delta-sigma sample rate of 100 MHz and an oscillator frequency $f_C$ of 60 GHz may be used. Alternatively, for a desired bandwidth of 80 kHz a delta-sigma sample rate of 1 MHz and an oscillator frequency $f_C$ of 800 MHz may be used. These frequencies correspond to ISM bands.

Figure 12:
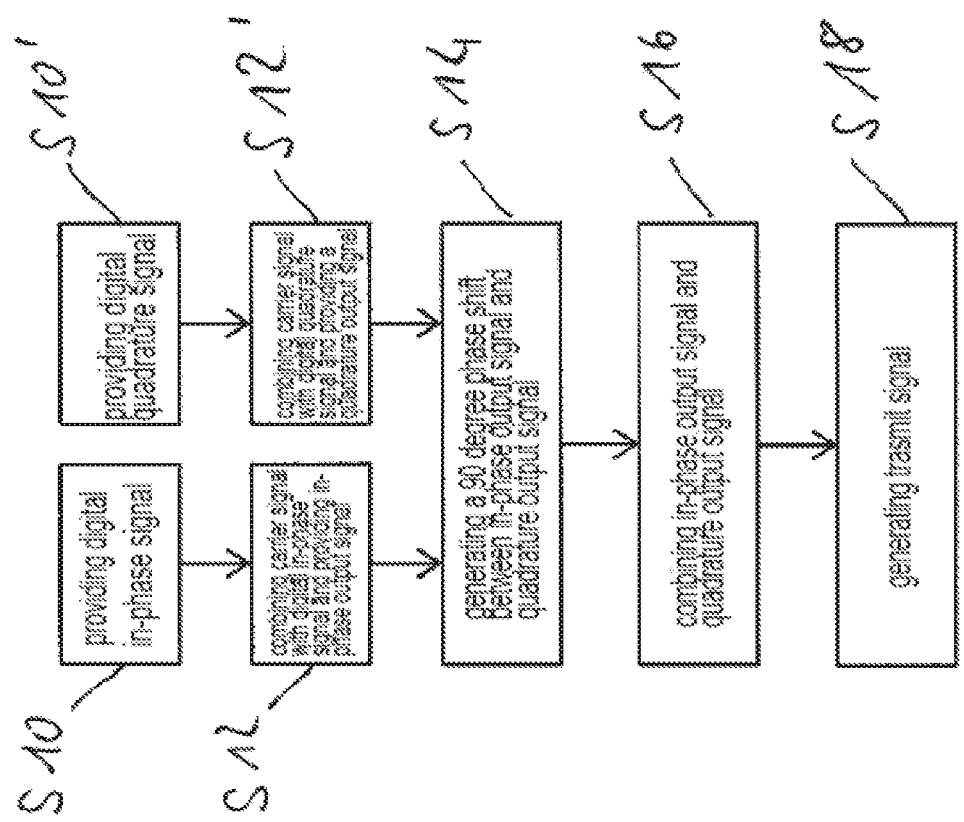
FIG. 12 shows a schematic illustration of a method according to an aspect of the present disclosure.

In FIG. 12 a modulation method according to an aspect of the present disclosure is schematically illustrated. The method comprises the steps of providing (step S10) a digital in-phase signal based on a modulation of an in-phase component of a baseband signal; providing (step S10') a digital quadrature signal based on a modulation of a quadrature component of a baseband signal; combining (step S12) a carrier signal with the digital in-phase signal and providing an in-phase output signal; combining (step S12') a carrier signal with the digital quadrature signal and providing a quadrature output signal; generating (step S14) a 90° phase shift between the in-phase output signal and the quadrature output signal; and combining (step S16) the in-phase output signal and the quadrature output signal and generating (step S18) a transmit signal.

Such a method may be carried out by a transmit system and partly or entirely be implemented in hard- and/or in software.

In the figures the signals are illustrated with respect to the frequency as a function of the time (frequency f on the x-axis and time t on the y-axis, cf. e.g., signal 90 in FIG. 8), in the frequency domain (frequency f on the x-axis and magnitude M on the y-axis, cf. e.g., signal 20 in FIG. 1), with respect to the distance as a function of the frequency (frequency f on the x-axis and distance D of the target to the radar system on the y-axis, cf. e.g., signal 44 in FIG. 3), or with respect to the velocity as a function of the frequency (frequency f on the x-axis and velocity V of the target with respect to the radar system on the y-axis). The illustrated signals are mostly signals of a single frequency as illustrated by an arrow in the frequency domain diagrams or signals that are asymmetric around the carrier in the frequency domain diagrams. In some of these illustrations noise components are also illustrated in the form of areas with inclined lines.

The illustrated noise shapes are for illustration purposes only. For instance, for a continuous wave (CW) carrier, the typical delta-sigma noise shape can easily be detected in the transmit signal with standard measurement equipment such as a reference receive antenna and a spectrum analyzer. The noise shape should always look symmetric. In case of FMCW, the noise and signal shape will also show up in the received beat frequency signal and might be detected at this point.

Preferably, the present disclosure may be implemented in the form of an integrated circuit (IC). Even in a single-chip solution, the mm-wave phase shifter and combination stage of the in-phase and quadrature path can be detected if the die of the chip is examined closely. X-Ray (non-destructive) or grinding (destructive) is necessary to do this.

Obviously, numerous modifications and variations of the present disclosure are possible in light of the above teachings. It is therefore to be understood that within the scope of the appended claims, the disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfil the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

Any reference signs in the claims should not be construed as limiting the scope.

It follows a list of further embodiments of the disclosed subject matter:

1. Modulation apparatus, comprising:
a first delta-sigma modulator for providing a digital in-phase signal based on a modulation of an in-phase component of a baseband signal;
a second delta-sigma modulator for providing a digital quadrature signal based on a modulation of a quadrature component of the baseband signal;
a first multiplicative combiner for combining a carrier signal with the digital in-phase signal and for providing an in-phase output signal;
a second multiplicative combiner for combining the carrier signal with the digital quadrature signal and for providing a quadrature output signal;
a delay component for generating a 90° phase shift between the in-phase output signal and the quadrature output signal; and
an additive output combiner for combining the in-phase output signal and the quadrature output signal and generating a transmit signal.

2. Modulation apparatus as defined in embodiment 1, wherein the delay component includes at least one of a delay line and/or an analogue filter.

3. Modulation apparatus as defined in any of the preceding embodiments, further comprising an oscillator for providing the carrier signal, in particular a voltage controlled oscillator for providing an adjustable carrier signal or a local oscillator for providing a constant frequency carrier signal.

4. Modulation apparatus as defined in any of the preceding embodiments, wherein the delay component is located in a signal path from the second multiplicative combiner to the output combiner and/or in a signal path from the oscillator to the second multiplicative combiner.

5. Modulation apparatus as defined in any of the preceding embodiments, wherein
the first multiplicative combiner includes a Gilbert cell for inverting the carrier signal depending on the digital in-phase signal; and
the second multiplicative combiner includes a Gilbert cell for inverting the carrier signal depending on the digital quadrature signal.

6. Modulation apparatus as defined in any of the preceding embodiments, wherein
the first multiplicative combiner is configured to switch between the carrier signal, an inverted carrier signal and zero depending on the digital in-phase signal; and
the second multiplicative combiner is configured to switch between the carrier signal, an inverted carrier signal and zero depending on the digital quadrature signal.

7. Modulation apparatus as defined in any of the preceding embodiments, further comprising a numerically controlled oscillator for providing the baseband signal.

8. Modulation apparatus as defined in any of the preceding embodiments, wherein the carrier signal is a mm-wave signal.

9. Radar system, comprising:
a modulation apparatus as defined in any of the embodiments 1-8;
a transmit antenna for transmitting the transmit signal;
a receiver for receiving a reflected signal resulting from a reflection of the transmit signal at a remote object;
an oscillator for providing the carrier signal to the transmitter and the receiver, in particular a local oscillator for providing a constant frequency carrier signal; and
a processor for determining a relative velocity of the remote object with respect to the radar system based on the reflected signal.

10. Radar system as defined in embodiment 9, wherein
the baseband signal has a periodically changing frequency or a temporarily constant frequency; and
the processor is configured to determine a distance of the remote object with respect to the radar system in addition to the relative velocity.

11. Radar system as defined in embodiments 9-10, comprising:
at least one further modulation apparatus as defined in any of the embodiments 1-8, wherein the first modulation apparatus and the at least one further modulation apparatus make use of the same carrier signal; and
at least one further transmit antenna for transmitting the at least one further transmit signal of the at least one further modulation apparatus; wherein
the processor is configured to determine a relative velocity and/or distance of the remote object with respect to the radar system based on the reflected signals.

12. Communication apparatus, comprising:
a modulation apparatus as defined in any of the embodiments 1-8; and
a digital baseband modulator for providing a baseband signal based on a data input.

13. Communication apparatus as defined in embodiment 12, further comprising a band-pass filter for filtering the transmit signal.

14. Modulation method, comprising the steps of
providing a digital in-phase signal based on a modulation of an in-phase component of a baseband signal;
providing a digital quadrature signal based on a modulation of a quadrature component of the baseband signal;
combining a carrier signal with the digital in-phase signal and providing an in-phase output signal;
combining the carrier signal with the digital quadrature signal and providing a quadrature output signal;
generating a 90° phase shift between the in-phase output signal and the quadrature output signal; and
combining the in-phase output signal and the quadrature output signal and generating a transmit signal.

15. A non-transitory computer-readable recording medium that stores therein a computer program product, which, when executed by a processor, causes the method according to embodiment 14 to be performed.

The present application claims priority to European Patent Application 15161951.7 filed by the European Patent Office on 31 Mar. 2015, the entire contents of which being incorporated herein by reference.

The invention claimed is:
1. A modulation apparatus, comprising:
oscillator circuitry configured to provide a carrier signal, the carrier signal being split into a first part and a second part;
first delta-sigma modulator circuitry configured to provide a digital in-phase signal based on a modulation of an in-phase component of a baseband signal;
second delta-sigma modulator circuitry configured to provide a digital quadrature signal based on a modulation of a quadrature component of the baseband signal;
first multiplicative combiner circuitry configured to combine the first part of the carrier signal received from the oscillator circuitry with the digital in-phase signal and to provide an in-phase output signal;
second multiplicative combiner circuitry configured to combine the second part of the carrier signal received from the oscillator circuitry with the digital quadrature signal and to provide a quadrature output signal, the second part of the carrier signal having a same phase with the first part of the carrier signal;
delay circuitry configured to generate a 90° phase shift between the in-phase output signal and the quadrature output signal; and
additive output combiner circuitry configured to combine the in-phase output signal and the quadrature output signal and generate a transmit signal, wherein
the delay circuitry is integrated in a signal path from the second multiplicative combiner circuitry to the additive output combiner circuitry, and
the delay circuitry is configured to generate the 90° phase shift by shifting a phase of the quadrature output signal provided by the second multiplicative combiner circuitry.

2. The modulation apparatus as claimed in claim 1, wherein the delay circuitry includes at least one of a delay line and/or an analogue filter.

3. The modulation apparatus as claimed in claim 1, wherein the oscillator circuitry is a voltage controlled oscillator configured to provide an adjustable carrier signal or a local oscillator configured to provide a constant frequency carrier signal.

4. The modulation apparatus as claimed in claim 1, wherein
the first multiplicative combiner circuitry includes a Gilbert cell for inverting the carrier signal depending on the digital in-phase signal; and
the second multiplicative combiner circuitry includes a Gilbert cell for inverting the carrier signal depending on the digital quadrature signal.

5. The modulation apparatus as claimed in claim 1, wherein
the first multiplicative combiner circuitry is configured to switch between the carrier signal, an inverted carrier signal and zero depending on the digital in-phase signal; and
the second multiplicative combiner circuitry is configured to switch between the carrier signal, an inverted carrier signal and zero depending on the digital quadrature signal.

6. The modulation apparatus as claimed in claim 1, further comprising a numerically controlled oscillator configured to provide the baseband signal.

7. The modulation apparatus as claimed in claim 1, wherein the carrier signal is a mm-wave signal.

8. A radar system, comprising:
a modulation apparatus as claimed in claim 1;
a transmit antenna configured to transmit the transmit signal;
a receiver configured to receive a reflected signal resulting from a reflection of the transmit signal at a remote object; and
processing circuitry configured to determine a relative velocity of the remote object with respect to the radar system based on the reflected signal, wherein
the oscillator circuitry is configured to provide the carrier signal to the transmitter and the receiver, the carrier signal being a constant frequency carrier signal.

9. The radar system as claimed in claim 8, wherein
the baseband signal has a periodically changing frequency or a temporarily constant frequency; and
the processing circuitry is configured to determine a distance of the remote object with respect to the radar system in addition to the relative velocity.

10. The radar system as claimed in claim 8, comprising:
at least one further modulation apparatus as claimed in claim 1, wherein the modulation apparatus and the at least one further modulation apparatus make use of the same carrier signal; and
at least one further transmit antenna configured to transmit at least one further transmit signal of the at least one further modulation apparatus, wherein
the processing circuitry is configured to determine a relative velocity and/or distance of the remote object with respect to the radar system based on the reflected signals.

11. A communication apparatus, comprising:
the modulation apparatus as claimed in claim 1; and
digital baseband modulator circuitry configured to provide the baseband signal based on a data input.

12. The communication apparatus as claimed in claim 11, further comprising a band-pass filter configured to filter the transmit signal.

13. A modulation method, comprising the steps of
providing, using oscillator circuitry, a carrier signal, the carrier signal being split into a first part and a second part;
providing a digital in-phase signal based on a modulation of an in-phase component of a baseband signal;

providing a digital quadrature signal based on a modulation of a quadrature component of the baseband signal;

combining, using first multiplicative combiner circuitry, the first part of a carrier signal received from the oscillator circuitry with the digital in-phase signal and providing an in-phase output signal;

combining, using second multiplicative combiner circuitry, the second part of the carrier signal received from the oscillator circuitry with the digital quadrature signal and providing a quadrature output signal, the second part of the carrier signal having a same phase with the first part of the carrier signal;

generating, using delay circuitry, a 90° phase shift between the in-phase output signal and the quadrature output signal; and combining, using additive output combiner circuitry, the in-phase output signal and the quadrature output signal and generating a transmit signal, wherein the delay circuitry is integrated in a signal path from the second multiplicative combiner circuitry to the additive output combiner circuitry, and the delay circuitry is configured to generate the 90° phase shift by shifting a phase of the quadrature output signal provided by the second multiplicative combiner circuitry.

14. A non-transitory computer-readable recording medium that stores therein a computer program product, which, when executed by a processor, causes the modulation method according to claim 13 to be performed.

15. The modulation apparatus as claimed in claim 1, wherein the delay circuitry is integrated only in the signal path from the second multiplicative combiner circuitry to the additive output combiner circuitry, and the delay circuitry is not integrated in a signal path from the first multiplicative combiner circuitry to the additive output combiner circuitry.

16. The modulation apparatus as claimed in claim 1, wherein the delay circuitry is configured to generate only the 90° phase shift between the in-phase output signal and the quadrature output signal, and a degree of a phase shift generated by the delay circuitry is not variable.

\* \* \* \* \*